Sept. 8, 1931.  V. KARAPETOFF  1,822,738
POLYPHASE INTERSHEATH CABLE
Filed Dec. 7, 1929
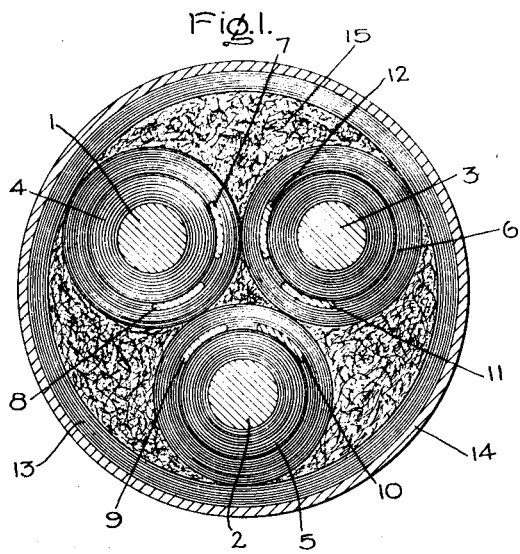
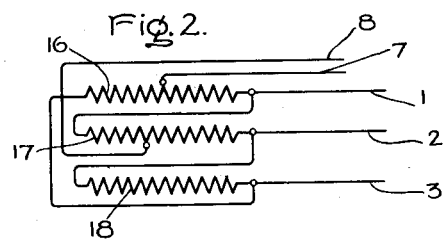
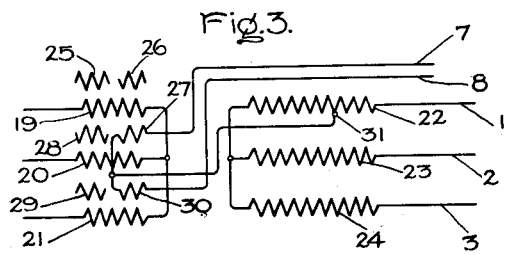
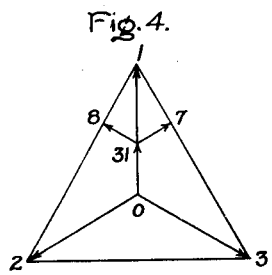
Inventor:
Vladimir Karapetoff,
by Charles E. Mullan
His Attorney.

Patented Sept. 8, 1931

1,822,738

UNITED STATES PATENT OFFICE

VLADIMIR KARAPETOFF, OF ITHACA, NEW YORK, ASSIGNOR TO GENERAL ELECTRIC COMPANY, A CORPORATION OF NEW YORK

POLYPHASE INTERSHEATH CABLE

Application filed December 7, 1929. Serial No. 412,500.

My invention relates to polyphase intersheath cables and particularly to intersheath connections for high voltage three phase intersheath cables.

As is well understood, the curve representing the potential gradient in dielectric substances which enter in cable insulation is not a straight line, as is the potential gradient in a homogenous dielectric between two plane parallel electrodes, but on the contrary is hyperbolic in shape, the maximum stress occurring at the high potential surface and dropping away rapidly as the distance from this surface is increased. This is because the dielectric flux spreads out from a conductor to the sheath. As a consequence, as cable voltages are increased, other things being equal, the breakdown stress of the insulation adjacent the conductor will inevitably be approached long before the bulk of the remaining insulation is in danger of being overstressed. It is very desirable to make the stresses in the dielectric more nearly uniform and as a solution of this problem it has been proposed to provide in the insulation an equipotential metallic sheet, layer, or intersheath, raised to such an intermediate voltage that the stress at this point is increased while at the same time the stress at the main conductor is decreased, thereby producing a resultant potential distribution in the insulation more uniform than it would otherwise be. By increasing the number of intersheaths and properly grading their potentials it would of course be possible to make the resultant potential gradient as nearly uniform as may be desired.

While the application of intersheaths to direct current and single phase alternating current cables is comparatively simple, its application to polyphase cables is not without difficulty. This is because, in such a cable, the potential of the intersheath associated with any one conductor must be at its proper value whenever the potential between its associated conductor and any other conductor is a maximum. Furthermore, the intersheath potential should not exceed this proper value with respect to its associated conductor at other instants, for if it does the intermediate insulation is in danger of being overstressed unless its thickness is increased to take care of this increased voltage. However, as one of the principal reasons for the use of intersheaths is to permit the use of a minimum of insulation, this would be undesirable. I propose as a solution of this problem the use of a plurality of intersheaths associated with each conductor, each of said surfaces following a different vector potential with time, each of said vector potentials, however, having equal instantaneous maximum values.

It is an object of my invention to provide a new and improved polyphase intersheath cable.

It is a further object of my invention to provide a new and improved system of electrical connections to the intersheaths of polyphase cables.

My invention will be better understood from the following description taken in connection with the accompanying drawings, and its scope will be pointed out in the appended claims.

In the drawings, Fig. 1 illustrates one aspect of my invention as applied to a three phase cable and is a cross section thereof, Fig. 2 is a diagrammatic showing of one system of connections for the cable of Fig. 1, Fig. 3 represents an alternative system of connections for the cable of Fig. 1, while Fig. 4 is a vector diagram of the voltage relations resulting from the arrangement of Fig. 3.

Referring now to Fig. 1, 1, 2 and 3 represent the conductors of my cable around each of which is a thick cylinder of insulation 4, 5 and 6 respectively. Such insulation is usually composed of layers of properly impregnated paper. Imbedded in each cylinder are two conducting strips or intersheaths, shown as 7 and 8 in cylinder 4, 9 and 10 in cylinder 5, and 11 and 12 in cylinder 6. As shown, these intersheaths are so located that each one is on a line joining two conductors and is between the conductors. With the shape of the strips as shown there would be an objectionable concentration of flux at the edges. Therefore, although for the sake of simplicity plain strips are shown, in reality their shape would be chosen to minimize this concentration of flux. In order to prevent bulges and fill up the space between these intersheaths, the cylinder of which the intersheaths are segments may be completed by a filler of any suitable insulating material, such as layers of strips of insulating paper as shown. Encircling all three conductors and their individual cylinders of insulation is a belt of insulation 13, which may also be made of properly impregnated paper, while enclosing the entire cable is an outer metallic protecting sheath 14, which is usually composed of lead. Interspersed between the cylinders of insulation 4, 5 and 6 and the encircling belt of insulation 13 is a filler 15 of any suitable material, such as wood pulp or jute.

With the above-described arrangement of intersheaths, there are as many separate intersheaths per cable conductor as there are line voltages per conductor. Hence, if each of the intersheaths associated with a particular conductor is made to follow a vector voltage which is in phase with a different line voltage of said conductor the insulation stresses may be graded properly when any particular line voltage is a maximum and at no other time will there be a tendency to overstress the insulation.

Referring now to Fig. 2, which illustrates one way of connecting the intersheaths so that they will have the proper voltages at the proper times, 16, 17 and 18 represent the secondary windings of the transformer which is connected to supply the cable with energy. As shown, these windings are delta connected, conductor 1 being connected to the junction of windings 16 and 17, conductor 2 being connected to the junction of windings 17 and 18, while conductor 3 is connected to the junction of windings 18 and 16. Intersheath strips 7 and 8 are connected respectively to taps in windings 16 and 17.

The operation of Fig. 2 is as follows. Due to the fact that the line voltage between conductors 1—3 is in phase with the voltage of winding 16, the instantaneous value of the voltage of intersheath 7 will always be proportional to the line voltage between conductors 1—3. In the same way the intersheath strip 8 which is connected to a proper tap in winding 17 will always have its voltage in phase with the line voltage between conductors 1 and 2. Although but two of the intersheaths have been shown connected, it is of course to be understood that the remaining intersheaths are connected in a like manner.

Should the main transformer supplying the cable have its secondary windings star connected, windings 16, 17 and 18 may represent the delta connected windings of an auxiliary auto transformer used for intersheath connections only. It should also be noted that my invention is not limited to a three phase system. Thus, no matter how many phases there are, if each cable conductor has a separate intersheath strip to grade each line voltage stress with respect to its insulation and the transformer windings supplying the cable are mesh-connected, the proper intersheath voltages may readily be obtained as described in Fig. 2.

Referring now to Fig. 3, which represents another way of securing the proper intersheath voltages, 19, 20 and 21 represent the primary windings of the main transformer for supplying the cable with energy. As shown, these windings are wye connected. The secondary winding of this transformer comprises the wye connected windings 22, 23 and 24, to which cable conductors 1, 2 and 3 are connected respectively. Associated with each primary winding 19, 20 and 21 are two tertiary windings 25—26, 27—28 and 29—30, respectively. Intersheath strips 7 and 8 are connected respectively to tertiary windings 27 and 30, while the remaining terminals of these tertiary windings are connected to a tap 31 in secondary winding 22.

The operation of Fig. 3 is as follows. Intersheath 7, being between conductors 1 and 3 (Fig. 1), should have its voltage follow the vector line voltage 1—3. That is to say, its voltage should correspond to a point in this vector, just as it does in Fig. 2, where it is connected to a tap in the winding which determines the voltage 1—3. The voltage of tap 31 corresponds of course to that of a point in the vector phase voltage between neutral and conductor 1. Also the vector representing the voltage between neutral and conductor 2, that is to say, the voltage of secondary winding 23 is in quadrature with the vector representing the line voltage 1—3, and is extending away from this line voltage. Therefore, if a vector voltage in phase opposition to the vector voltage of winding 23 is added to the voltage vector whose end is tap 31, and is made of the proper length, the end of the resultant of these two vectors will lie in the vector representing the line voltage 1—3. Therefore, as the voltage of tertiary winding 27 is in phase with that of winding 23, but its connections are reversed with respect to point 31 it is clear that if winding 27 is of the proper number of turns, the end of the resultant of the vector voltage represented by the vector whose end is point 31 and the voltage of winding 27 will lie in the vector representing line 1—3, which is what is desired. Reference to Fig. 4 will make clear the above description. Similarly, intersheath 8 should have a voltage which corresponds to a point in vector line voltage 1—2, and this is accomplished by adding to the voltage at tap 31 the vector voltage of tertiary winding 30, which is in phase opposition to the voltage of winding 24 and is of such magnitude that the end of the resultant voltage of intersheath strip 8 lies in the vector line voltage 1—2. The remaining intersheath strips are connected in a similar manner, although for the sake of simplicity the connections are not shown. Thus, for example, intersheath strip 10 would be connected to a tap in winding 23 through either winding 25 or 26 reversed.

It will of course also be obvious to those skilled in the art that my invention is not limited to the particular arrangement of connections shown. Thus, for example, the voltage of intersheath strip 7 may also be made to have the proper value by connecting it to tap 31 through tertiary windings 29 or 30 not reversed. This is because the voltage of tertiary windings 29 or 30 is in phase with the voltage of winding 24 and this voltage does vectorially extend obliquely toward the vector representing line voltage 1—3. Thus, by properly selecting the position of tap 31 and the number of turns of windings 29 or 30 any point on vector voltage 1—3 may be attained.

While I have shown and described particular embodiments of my invention it will, of course, be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a polyphase cable, a source of polyphase current connected thereto, a plurality of intersheaths associated with each conductor thereof, there being at least as many intersheaths associated with each conductor as there are vector line voltages associated with each conductor, and means for impressing an alternating voltage on each intersheath which is in phase with a vector line voltage of the conductor with which each intersheath is associated.

2. In combination, a polyphase cable, a plurality of intersheaths associated with each conductor of said cable, one between its associated conductor and each of the other conductors, and means for impressing a voltage on each intersheath which is in phase with the line voltage between the conductor which produces the dielectric stress the particular intersheath is designed to grade.

3. In combination, a polyphase cable, a plurality of intersheaths, whose number is one less than the number of phases, associated with each conductor of said cable and means for impressing an alternating voltage on each intersheath which is in phase with the particular line voltage which produces the dielectric stress the particular intersheath is designed to grade.

4. In combination, a polyphase cable, means for supplying polyphase voltage to the conductors thereof, a plurality of concentric segmental intersheath strips associated with each conductor of said cable, at least one of said intersheath strips per conductor being between its associated conductor and every other conductor, and means for impressing on each intersheath a voltage which is in phase with the line voltage producing the dielectric stress which the particular intersheath is designed to grade, said intersheath voltages all being fractions of said line voltage.

5. In combination, a three phase cable, a three phase source of electrical energy connected to the conductors thereof, a plurality of intersheaths associated with each conductor, there being at least one intersheath per conductor per line voltage of said conductor, and means for impressing an alternating voltage on each intersheath which is in phase with its line voltage.

6. In combination, a polyphase cable, a source of polyphase current connected thereto, a plurality of intersheaths associated with each conductor thereof, there being at least one intersheath per conductor per line voltage of said conductor, and means for impressing an alternating voltage on each intersheath which is in phase with its line voltage, said means comprising mesh-connected transformer windings whose junctions are connected to the cable conductors, said intersheaths being connected to appropriate taps in said windings.

7. In combination, a polyphase cable, means for supplying polyphase voltage to the conductors thereof, a plurality of concentric segmental intersheath strips associated with each conductor of said cable, at least one of said intersheath strips per conductor being between its associated conductor and every other conductor, and means for impressing on each intersheath a voltage which is in phase with the line voltage producing the dielectric stress which the particular intersheath is designed to grade, said intersheath voltages all being fractions of said line voltage, said means comprising transformer windings connected in mesh between the conductors of said cable, said intersheaths being connected to taps in said windings.

8. In combination, a three phase cable, a three phase source of electrical energy connected to the conductors thereof, said source of energy including a transformer whose secondary windings are mesh-connected, a plurality of intersheaths associated with each conductor, there being at least one intersheath per conductor per line voltage of said conductor, and means for impressing an alternating voltage on each intersheath which is in phase with its line voltage, said means comprising appropriate taps in said secondary windings.

9. In combination, a polyphase cable having a plurality of conductors, means for supplying current to said cable including a transformer having star-connected windings whose secondary windings are connected to said conductors, each conductor having associated therewith a separate intersheath per line voltage of said conductor, tertiary windings on said transformer and means connecting each intersheath to a tap in one of the secondary windings through one of said tertiary windings.

10. In combination, a three phase cable including three conductors and a separate intersheath per conductor per line voltage of said conductor associated therewith, means for supplying electrical energy to said cable including a transformer having wye connected primary and secondary windings, said secondary windings being connected to the conductors of said cable, a pair of tertiary windings associated with each primary winding of said transformer, and means connecting each intersheath to a point in the secondary winding which is connected to its associated conductor through one of the tertiary windings which is associated with one of the primary windings which is associated with either of the remaining secondary windings.

11. In combination, a three phase high voltage cable including three conductors and a separate intersheath per conductor per line voltage of said conductor, associated with each conductor, means for supplying electrical energy to said cable including a three phase transformer having wye connected primary and secondary windings, said secondary windings being connected respectively to said conductors, a pair of tertiary windings associated with each primary winding of said transformer, and means connecting each intersheath to a point in the secondary winding which is connected to its associated conductor through the tertiary winding whose induced voltage is in quadrature with the line voltage producing the dielectric stress which said intersheath is designed to grade.

12. In combination, a three phase high voltage cable including three conductors and a separate intersheath per conductor per line voltage of said conductor, associated with each conductor, means for supplying electrical energy to said cable including a three phase transformer having wye connected primary and secondary windings, said secondary windings being connected respectively to said conductors, a pair of tertiary windings associated with each primary winding of said transformer, and means connecting each intersheath to a point in the secondary winding which is connected to its associated conductor through the tertiary winding whose induced voltage is in phase opposition to that of the secondary winding whose voltage is in quadrature with the line voltage producing the dielectric stress which said intersheath is designed to grade.

In witness whereof, I have hereunto set my hand this 6th day of December, 1929.

VLADIMIR KARAPETOFF.